Nov. 22, 1938.  C. A. FAUBION  2,137,738
ELECTRIC GENERATOR
Filed Aug. 4, 1937  2 Sheets-Sheet 1
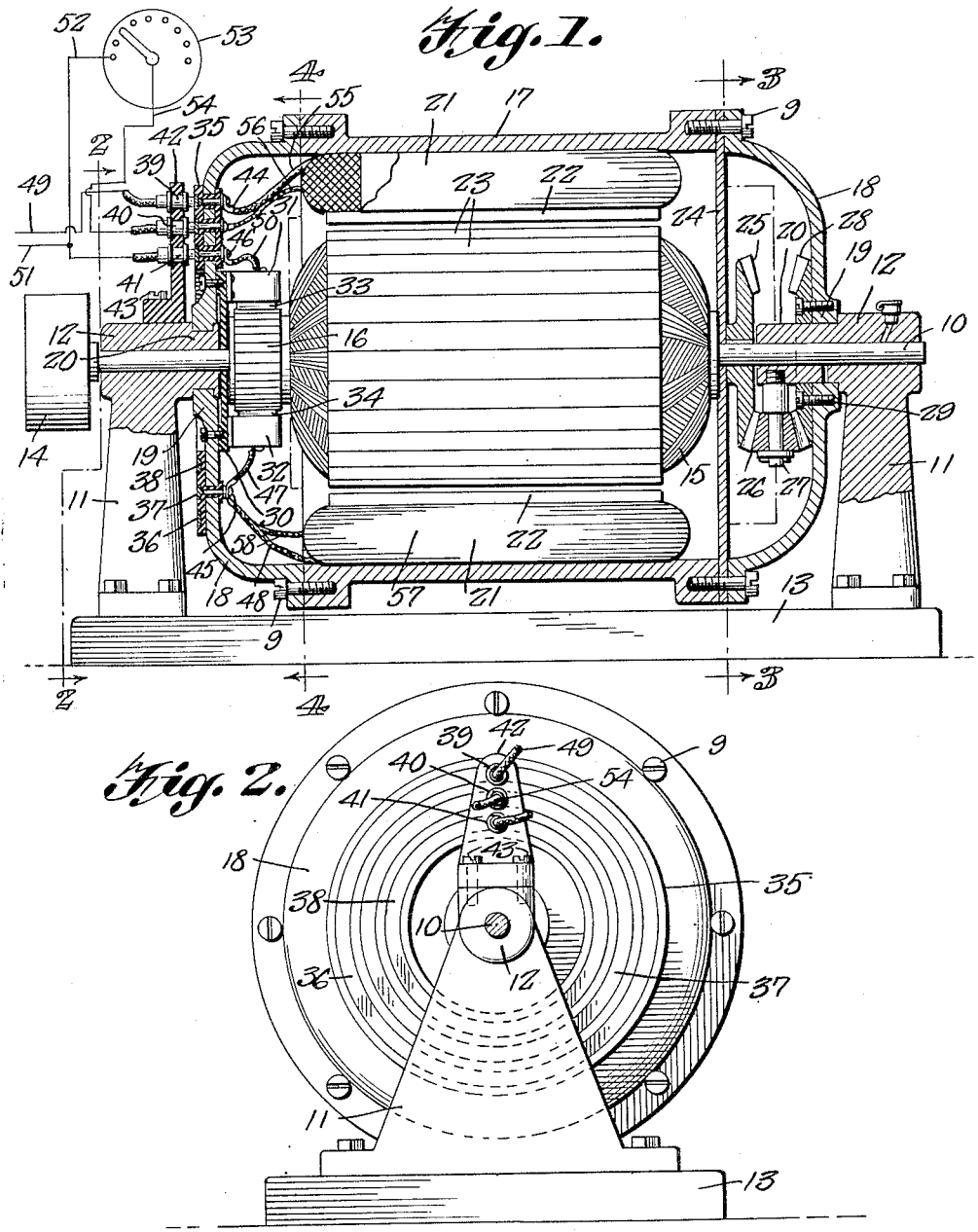
Charles A. Faubion,
INVENTOR
BY Victor J. Evans & Co.
ATTORNEYS
WITNESS Nov. 22, 1938.  C. A. FAUBION  2,137,738
ELECTRIC GENERATOR
Filed Aug. 4, 1937   2 Sheets-Sheet 2

Charles A. Faubion,
INVENTOR
BY Victor J. Evans & Co.
ATTORNEYS

WITNESS

Patented Nov. 22, 1938

2,137,738

UNITED STATES PATENT OFFICE 2,137,738

ELECTRIC GENERATOR

Charles A. Faubion, San Antonio, Tex., assignor of one-half to Geo. C. Rehmet and Chas. E. Wolcott, both of Alice, Tex.

Application August 4, 1937, Serial No. 157,442

2 Claims. (Cl. 171—252)

This invention relates to electric generators and has for an object to provide a wind driven electric generator adapted to deliver its rated output while running at approximately one-half the speed ordinarily required. This end is attained by coupling the field coil and the armature to rotate oppositely to each other.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a longitudinal sectional view of a generator constructed in accordance with the invention.

Figure 2 is an end elevation of the generator looking in the direction of the arrows on the line 2—2 of Figure 1.

Figure 3:
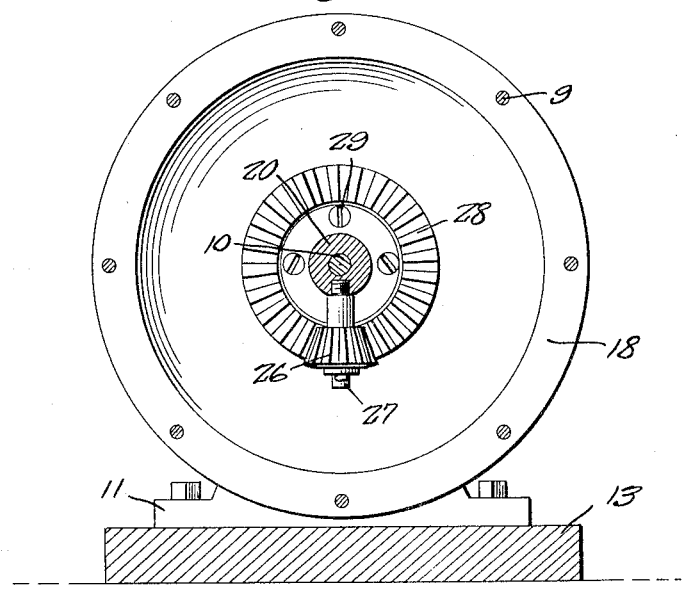
Figure 3 is a cross sectional view taken on the line 3—3 of Figure 2 showing the planetary gear for rotating the armature and the field coils oppositely to each other.
Figure 4:
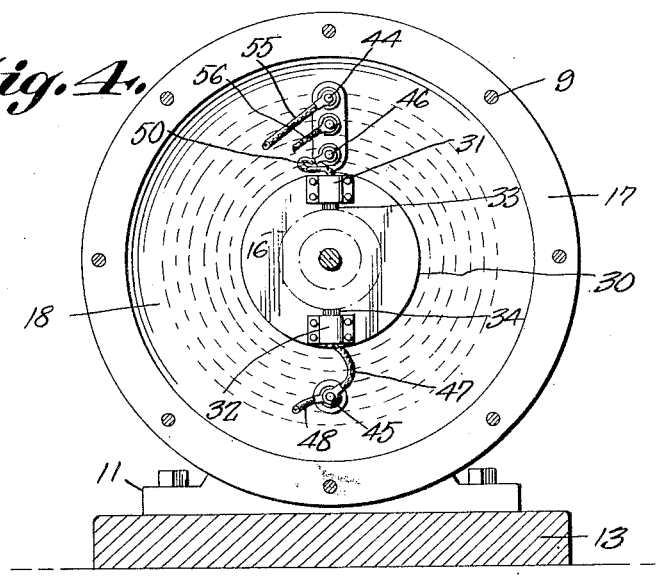
Figure 4 is a cross sectional view on the line 4—4 of Figure 1 with the commutator removed.

Referring now to the drawings in which like characters of reference designate similar parts in the various views, 10 designates a shaft which is supported at the ends by a pair of pedestals 11 having bearings 12. The pedestals are bolted to a bed plate 13. The shaft is equipped with a pulley 14 outside of one of the pedestals by means of which the shaft is rotated in one direction.

The shaft is equipped with a conventional armature 15 and a conventional commutator 16. A field coil supporting cylinder 17 is provided with end shells 18 having bearings 19 which are mounted on stub shafts 20 that project from the bearings 12. The end shells are bolted as shown at 9 to the ends of the cylinder 17. Conventional field coils 21 are arranged radially on the inner periphery of the cylinder 17 and have their cores 22 confronting the pole pieces 23 of the armature. A plate 24 is bolted to one end of the cylinder between the flanges of the end shell and the cylinder and coacts with the end shell in forming a gear case.

For rotating the field coil cylinder oppositely to the armature a bevel gear 25 is keyed to the shaft 10 and meshes with one side of an idle pinion 26 which is mounted on a shaft 27 which is screw threadedly engaged with the stub shaft 20 near the gear 25. A bevel gear 28 is bolted to the end shell 18 as shown at 29 and meshes with the opposite side of the idle pinion. Thus when the shaft 10 is rotated in one direction the bevel gear 25 will rotate the idle pinion 26 and the pinion in turn will rotate the gear 28 to drive the field coil supporting cylinder oppositely to the armature.

The end shell at the opposite end of the cylinder from the gear case has secured thereto a disc 30 of insulating material. A pair of brush holders 31 and 32 are arranged at diametrically opposite points on the disc and carry brushes 33 and 34 which engage the commutator 16.

An annulus 35 of insulating material is fixed to the end shell 18 near the pulley end of the generator and three concentric collector rings 36, 37 and 38, are countersunk in the insulating annulus. Circuit terminal brushes 39, 40 and 41 are mounted in an insulating bracket 42 that is bolted as shown at 43 to the bearing 12, these brushes having wiping contact with the respective collector rings 36, 37 and 38. The current is supplied to the collector rings through conductors 44, 45 and 46, see Figure 1.

The generator is compound wound, the shunt winding having a variable resistance connected therein, and being excited from any suitable exciter, as will now be described. Current from the armature 15 is taken from the commutator brush 33 and supplied to conductor 50 and innermost collector ring 38. The brush 41 engages collector ring 38 and picks up and delivers current to load line 51, thence through the devices or load and back to brush 39 and to outermost collector ring 36, to which conductor 44 is connected and supplies current to field coils 21 and to conductor 46. A conductor 47 connects conductor 48 at binding post 45 to brush 34 on commutator completing the field circuit.

Conductor 52 is connected to load line 51 and delivers current to rheostat 53. Conductor 54 is connected to rheostat and delivers current to brush 40 and central collector ring 37. A conductor 56 connected to central collector ring 37 supplies current to shunt wound field coils 57 and to conductor 58 one end of which is connected to conductor 47 completing the shunt field circuit, for regulating the strength of the field.

It will be observed that the commutator brushes, and field coils 21 rotate as a unit in one direction while the armature 23 and commutator 16 rotate in the opposite direction, consequently the rated output of the generator will be obtained by driving the pulley 14 at approximately one-half the speed that would be necessary were the field coils stationary and the commutator alone rotated. Thus wind power may be utilized to operate the generator efficiently.

From the above description it is thought that the construction and operation of the invention will be fully understood without further explanation.

What is claimed is:

1. An electric generator comprising a driving shaft, bearings for the driving shaft, stub shafts integral with the bearings, an armature on the driving shaft, a field coil cylinder having end shells rotatably supported upon said stub shafts, field coils on the cylinder confronting the armature, a plate carried by the cylinder and coacting with one of said end shells in forming a gear case in one end of the cylinder, a gear fixed to the driving shaft, a gear fixed to the end shell of the gear case, one of said stub shafts projecting into the space between said gears, and an idle pinion carried by said projecting stub shaft and meshing with both gears and functioning to drive the field coil supporting cylinder oppositely to the direction of rotation of the armature.

2. A compound wound electric generator comprising a shaft, pedestals having bearings supporting the shaft, there being stub shafts on the bearings, an armature fixed to the shaft, a commutator fixed to the shaft, a cylinder having end shells provided with bearings receiving said stub shafts, field coils carried by the cylinder confronting the armature, a plate coacting with one of the end shells in forming a gear case at one end of the cylinder, one of said stub shafts projecting into said gear case, an idle pinion carried by the last named stub shaft, a gear fixed to the shaft which carries the armature engaging one side of said pinion, a gear fixed to the last named end shell of the cylinder engaging the opposite side of the pinion, said gears and pinion forming means for rotating the field coil supporting cylinder opposite to the armature, collecting brushes carried by and insulated from the end shell on the end of the cylinder opposite the gear case, said brushes rotating as a unit with the field coils supporting cylinder, collecting rings on the last named end shell electrically connected to said brushes and to the field coils, and load line stationary brushes supported adjacent the collecting rings and having wiping contact with the collecting rings.

CHARLES A. FAUBION.